3,037,061
PROCESS FOR THE PRODUCTION OF NITRO-ALKENES AND NITROALCOHOLS

Gustave B. Bachman and Norman W. Standish, West Lafayette, Ind., assignors to Purdue Research Foundation, Lafayette, Ind., a corporation of Indiana
No Drawing. Filed Apr. 17, 1959, Ser. No. 807,005
14 Claims. (Cl. 260—638)

Our invention relates to an improved process for the production of 2-nitro-1-alkenes and nitro alcohols and more particularly, to the production of these substances by the vapor phase reaction of nitro alkanes and formaldehyde in the presence of magnesium sulfate and an amine selected from the group consisting of tertiary aliphatic amines containing up to 6 carbon atoms and compounds which decompose under reaction conditions to form tertiary aliphatic amines having up to 6 carbon atoms.

U.S. Patent No. 2,298,375 describes the vapor phase condensation of a nitro alkane and formaldehyde over a solid dehydrating catalyst impregnated with an acid, such as sulfuric or phosphoric acid, or metallic oxides on a catalyst support, such as alumina or silica gel to form nitro olefins. We have now discovered that improved yields of nitro olefins can be obtained by reacting a 1-nitroalkane with formaldehyde in the vapor phase and in the presence of magnesium sulfate and catalytic amounts of a tertiary aliphatic amine containing up to 6 carbon atoms or compounds which decompose under reaction conditions to form tertiary aliphatic amines containing up to 6 carbon atoms.

The nitro alkane vapors which are operative in our process to form the 2-nitro-1-alkenes are the vapors of 1-nitro alkanes having at least 2 carbon atoms and include 1-nitroethane, 1-nitropropane, 1-nitrobutane, 1-nitrohexane, 1-nitrononane, 1-nitroundecane, 2-methyl-2-nitropropane, etc. The nitro alkane vapors which are operative to form nitro alcohols are nitro alkanes having the nitro group substituted on primary or secondary carbon atoms. Examples of such nitro alkanes include the above-mentioned nitro alkanes and compounds such as 2-nitropropane, 2-nitropentane, 3-nitrohexane, 4-nitrononane, etc.

The formaldehyde which we use in our process can be introduced in either the liquid, solid or gaseous form. We prefer to use the commercially prepared 37% aqueous solution of formaldehyde known as Formalin.

Two catalysts are required in our process, as indicated above. Magnesium sulfate is one of the required catalysts. The catalyst may be pure solid magnesium sulfate or the magnesium sulfate may be deposited upon support materials such as silica gel, asbestos, fire brick, and tile. We prefer to impregnate a catalyst support with magnesium sulfate as pure magnesium sulfate quickly deteriorates under the reaction conditions of our process. In a continuous process the activity of the catalyst may be maintained by continually adding small amounts of fresh magnesium sulfate to the reaction mixture. Of the many catalyst supports tested, a commercial product known as "Suntile," a highly porous tile manufactured by the Cambridge Tile Company, Cincinnati, Ohio, was found to have maximum utility in our process.

The organic catalysts which form a part of our catalyst mixture are tertiary aliphatic amines having up to 6 carbon atoms and ammonium compounds which decompose under the reaction conditions to form these compounds in situ. Such amine catalysts include, for example, trimethylamine, triethylamine, monomethyldiethylamine, monoethyldimethylamine, monopropyldimethylamine, etc. Among the compounds which decompose under reaction conditions to give the tertiary aliphatic amines described above are benzyltrimethylammonium hydroxide; benzyltriethylammonium hydroxide, etc. The concentration of organic base in the reaction mixture can range from about 0.09 to 10.0 mole percent. Where small amounts of amine catalyst are included in the reaction mixture a major portion of the final product will be nitro alkene while the use of relatively large amounts of amine catalyst results in the formation of a larger portion nitro alcohol. We prefer to prepare our nitro olefins with from about 0.09 to about 0.91 mole percent amine and our nitro alcohols using from about 0.5 to 10.0 mole percent amine.

Of the described organic catalysts, we prefer to use the compound trimethylamine due to the fact that we can obtain maximum yields when using this catalyst, though good yields are also obtained when the other catalysts of our invention are utilized in the described process.

The temperature at which the reaction is carried out is very important. At temperatures below 200° C. large amounts of heavy, black, tar-like materials are formed in the reactor. This material can be washed from the reactor by dilute solutions of mineral acids. At temperatures above 390° C. the yield rapidly drops off so that at temperatures above about 410° C. very little nitro alkene is recovered. We have found good yields are obtained in our process at temperatures ranging from about 240° to about 400° C. and that optimum temperatures for our process range from about 250° to about 390° C.

Good yields of nitro olefins and nitro alcohols are obtained when from about 1:1 to 1:1.5 molar ratios of 1-nitro alkane to formaldehyde are utilized in our process. We prefer, however, to utilize on the order of 1:1.2 moles of nitrol alkane to formaldehyde, as we have found that we obtain slightly better yields at this molar concentration.

We have found that some metals, such as copper, silver, and cobalt, and some salts, such as the copper salts and lead chromate, seem to be detrimental to our process.

The following examples more fully illustrate our invention. It is not intended that our invention be limited to the products, processes, etc., set out, but rather it is intended that all equivalents obvious to those skilled in the art be included within the scope of our invention as claimed.

Example I

A reactor was constructed from a 16 mm. x 122 cm. Pyrex tube having catalyst supporting indentations at its lower end. A thermocouple was sealed in a 6 mm. Pyrex tube and suspended in the chamber so that all temperature readings could be taken from the middle of the column which, after insulation was found to have a temperature drop of 10° at 250° C. and 30° at 350° C. The upper end of the column was attached to a dropping funnel by means of a ground glass joint and all liquid reactants were introduced into the reaction zone through this funnel as stirred mixtures. The lower end of the reactor was sealed to a 20 mm. x 20 cm. Pyrex tube which served as an air condenser. The condenser was attached in turn to an ice-cooled collecting flask. The reactor was filled with magnesium sulfate-impregnated "Suntile," prepared by placing bits of "Suntile" in a 100 cc. water solution of 25 g. of magnesium chloride, soaking the tile for two days, adding sulfuric acid to form magnesium sulfate, concentrating the sulfate mixture, washing the "Suntile" with dilute ammonium hydroxide and water and drying the tile at 350° C. The reactor was electrically heated to 350–360° C. and a mixture of about 44.2 g. (0.5 mole) of 1-nitropropane, 49.8 g. of Formalin (0.6 mole of formaldehyde) and 0.25 g. (0.0025 mole) of triethylamine was introduced into the reactor over a period of 40 minutes. The product trapped at the base of the column was taken up in ether, the water layer was washed twice with 30 ccs. of ether and discarded. The ether layer was washed with 20 cc. portions of 1 molar hydrochloric acid, sodium bicarbonate and finally water, and dried over anhydrous magnesium sulfate. About 24 g. of a light green liquid distilled at 57–60° (44 mm.). This would indicate a yield of about 40.2% 2-nitro-1-butene, based on the composition-refractive index curve. This curve was prepared by comparing the refractive index of the recovered product with the refractive index of solutions of 1-nitropropane and known amounts of 2-nitro-1-butene. The 2-nitro-1-butene utilized in establishing the refractive index curve was prepared by dropping the corresponding alcohol on hot phthalic anhydride. The para-toluidine derivative melted at 67–8° C.

*Example II*

Into the reactor of Example I containing "Suntile" impregnated with magnesium sulfate a mixture of 51.6 g. (0.5 mole) of 1-nitrobutane was mixed with 49.8 g. of Formalin (0.6 mole of formaldehyde) and 0.25 g. (0.0025 mole) of triethylamine over a period of 45 minutes. The reaction column was maintained at 300° C. throughout the time the reaction mixture was being introduced into the column. About 30 g. of a light green liquid was recovered, which distilled at 80–85° C. (55 mm.) and which had a para-toluidine derivative melting point of 70.5–71.5° C. Approximately 35.4% (based on the composition-refractive index curve) of 2-nitro-1-pentene was recovered.

*Example III*

Into the reactor of Example I containing asbestos impregnated with magnesium sulfate and maintained at a temperature of 350° C., a mixture of 1 mole of nitropropane, 2-moles of formaldehyde and 0.01 mole of benzyltrimethylammonium hydroxide was incrementally introduced. 17 g. of 2-nitro-1-butene was recovered. This represents a yield of 13.8%, based on the composition-refractive index curve.

*Example IV*

Into the reactor of Example I containing fire brick impregnated with magnesium sulfate was incrementally introduced a mixture of 1 mole of 1-nitropropane, 1.2 mole of formaldehyde, and 0.005 moles of trimethylamine. The reactor was maintained at 300° C. throughout the reaction period and 25 g. of 2-nitro-1-butene, having a boiling point of 65° (75 mm.) was recovered. This represents an actual yield of 38% of theoretical, based on the composition-refractive index curve.

*Example V*

Several runs were made in the apparatus of Example I to determine the optimum amine concentration for the preparation nitro alkenes. All runs were made with a 1:1.2 molar ratio of 1-nitropropane to formaldehyde. Temperatures were maintained at about 300° C. throughout these runs. The yields and mole percent amines used are set out in the following table:

| Mole Percent of Triethylamine | Yield Percent —Nitro Alkene |
|---|---|
| 0.00 | 3.1 |
| 0.09 | 36.6 |
| 0.23 | 40.2 |
| 0.45 | 18.2 |
| 0.91 | 17.2 |
| 1.36 | 3.4 |
| 1.82 | 3.2 |

*Example VI*

To determine the optimum concentration of amine needed for nitro alcohol production, runs similar to the runs of Example V were made except that a 1:1 molar ratio of 1-nitropropane to formaldehyde was passed through the reactor. The mole percentages of amine used and yields are set out in the following table:

| Mole Percent Trimethylamine | 2-nitro-1-butanol, Percent Conv. | Percent yield |
|---|---|---|
| 1.00 | 34.6 | 47.9 |
| 2.00 | 42.6 | 48.4 |
| 3.00 | 44.5 | 48.0 |
| 4.00 | 45.3 | 45.3 |
| 6.00 | 32.1 | 32.1 |

*Example VII*

Triethylamine, 3 g. (0.03 mole) was slowly added to a mixture of 1-nitropropane, 44.5 g. (0.5 mole) and Formalin, 49.8 g. (0.5 mole formaldehyde). The solution became homogeneous. This mixture was slowly added to the reactor of Example I at 300° C. The product was taken up in ether and washed with 1 M hydrochloric acid, sodium bicarbonate and water. The ether solution was dried over anhydrous sodium sulfate. About 1 g. of low boiling, light green liquid was obtained which would represent a conversion of less than 2% to 2-nitro-1-butene. Further distillation yielded 2-nitro-1-butanol; B.P. 85–95° (8 mm.), $n_D^{30}$ 1.4390, 44.5% conversion, (on $RNO_2$), 48.0% yield. (Lit. B.P. 127–30° (35 mm.), $n_D^{19}$ 1.4395.)

*Example VIII*

About 44.2 g. (0.5 mole) of 2-nitropropane and 49.8 g. of Formalin (0.6 mole of formaldehyde) were mixed with 0.25 g. (0.0025 mole) of triethylamine and slowly added to the column of Example I over a period of 45 minutes. The resulting product was taken up in ether and washed with 1 M hydrochloric acid until no color could be seen in the acid layer and then with sodium bicarbonate and finally with water. It was dried over magnesium sulfate. About 10 g. of 2-nitropropane was recovered by distillation under reduced pressure. The remaining solution completely solidified upon cooling. About 18.6 g. of the expected nitro alcohol was obtained, conversion 30.1%, yield 47.5%. After recrystallization from ethanol the melting point was 83–4° (Lit. 82°).

This is a continuation-in-part of our U.S. Serial No. 794,826, filed February 24, 1959, now abandoned.

Now having described our invention, what we claim is:

1. A process for the manufacture of 2-nitro-1-alkenes which comprises contacting vapors of a 1-nitroalkane having at least 2 carbon atoms with formaldehyde at temperatures ranging from about 240° C. to about 400° C. in the presence of magnesium sulfate and from about 0.09 to about 0.91 mole percent based on the total weight of the reactants, of a tertiary aliphatic amine having up to 6 carbon atoms.

2. A process for the manufacture of 2-nitro-1-alcohols which comprises contacting vapors of a nitroalkane selected from the group consisting of nitroalkanes having the nitro group substituted on a primary carbon atom and nitroalkanes having the nitro group substituted on a secondary carbon atom with formaldehyde at temperatures ranging from about 240° C. to about 400° C. in the presence of magnesium sulfate and from about 0.5 to about 10.0 mole percent, based on the total weight of the reactants, of a tertiary aliphatic amine having up to 6 carbon atoms.

3. The process of claim 1 wherein 1-nitroethane is contacted with formaldehyde.

4. The process of claim 1 wherein 1-nitropropane is contacted with formaldehyde.

5. The process of claim 1 wherein 1-nitrobutane is contacted with formaldehyde.

6. The process of claim 1 wherein 1-nitropentane is contacted with formaldehyde.

7. The process of claim 1 wherein 1-nitrohexane is contacted with formaldehyde.

8. The process of claim 1 wherein 1-nitroheptane is contacted with formaldehyde.

9. The process of claim 1 wherein 1-nitrooctane is contacted with formaldehyde.

10. A process for contacting vapors of a nitroalkane having at least 2 carbon atoms with formaldehyde to produce a product containing a compound selected from the group consisting of 2-nitro-1-alkenes and 2-nitro-1-alkanols, the step comprising contacting the nitroalkane with the formaldehyde at temperatures ranging from about 240° C. to about 400° C. in the presence of magnesium sulfate and a tertiary aliphatic amine having up to 6 carbon atoms; said product containing 2-nitro-1-alkenes being prepared employing from about 0.09 to 0.91 mole percent of the tertiary aliphatic amine based upon the total weight of reactants, and said product containing 2-nitro-1-alkanols being prepared employing from about 0.5 to 10 mole percent of the tertiary aliphatic amine based upon the weight of the reactants.

11. The process of claim 10 wherein the temperatures range from about 250° C. to 390° C.

12. The process of claim 10 wherein the amine is a tertiary alkyl amine.

13. The process of claim 12 wherein the tertiary alkylamine is trimethylamine.

14. The process of claim 12 wherein the tertiary alkylamine is triethylamine.

References Cited in the file of this patent

UNITED STATES PATENTS

| | | |
|---|---|---|
| 2,132,330 | Vanderbilt | Oct. 4, 1938 |
| 2,298,375 | Hasche | Oct. 13, 1942 |